US006684472B2

(12) United States Patent
Abdelmoula et al.

(10) Patent No.: US 6,684,472 B2
(45) Date of Patent: Feb. 3, 2004

(54) SLEEVE FOR PULLING TOOL, CORRESPONDING PULLING TOOL AND CORRESPONDING METHOD OF REMOVAL

(75) Inventors: Foued Abdelmoula, Gravigny (FR); Jean-Pierre Vanderdood, Marcilly sur Eure (FR)

(73) Assignee: Facom, Morangis (FR)

( * ) Notice: Subject to any disclaimer, the term of this patent is extended or adjusted under 35 U.S.C. 154(b) by 9 days.

(21) Appl. No.: 09/837,294

(22) Filed: Apr. 19, 2001

(65) Prior Publication Data

US 2001/0032385 A1 Oct. 25, 2001

(30) Foreign Application Priority Data

Apr. 21, 2000 (FR) ........................................... 00 05199

(51) Int. Cl.[7] ............................ B23P 19/04; B23Q 1/00

(52) U.S. Cl. ............................ 29/262; 29/259; 29/264; 29/283

(58) Field of Search ................................ 29/426.5, 259, 29/256, 258, 260, 261, 262, 264, 265, 283

(56) References Cited

U.S. PATENT DOCUMENTS 1,964,470 A * 6/1934 King ........................... 29/264
3,986,242 A * 10/1976 Kerr ............................ 29/261
4,562,631 A * 1/1986 Welch ......................... 29/259
5,909,911 A * 6/1999 Long ........................... 29/259

* cited by examiner

*Primary Examiner*—John C. Hong
(74) *Attorney, Agent, or Firm*—Wenderoth, Lind & Ponack, L.L.P.

(57) ABSTRACT

A pulling tool (1) of the type used on the end of a shaft (2) to remove a mechanical part (3) that is force-fitted or stuck to the shaft (2). The tool includes a threaded rod (20) and a body (5) to which legs (6) are hinged. A sleeve is designed to be mounted on the threaded rod (20) and to form a bearing member for a member (27) which inhibits rotation of the legs (6) during screwing of the threaded rod. Thus, the sleeve acts as a member for protecting the threaded rod (20) from the rotation-inhibiting member (27).

12 Claims, 2 Drawing Sheets

SLEEVE FOR PULLING TOOL, CORRESPONDING PULLING TOOL AND CORRESPONDING METHOD OF REMOVAL

BACKGROUND OF THE INVENTION

1. Field of the Invention

The invention relates to a pulling tool of the type used on the end of a shaft to remove a mechanical part force-fitted to the shaft. The tool comprises a body to which are hinged legs that each have a free end designed to bear on a rear face of the mechanical part to be removed, and a central threaded rod capable of a screw action relative to the body and to the legs, its proximal end has rotational driving means and its distal end being designed to bear on a free front end of the shaft.

2. Description of Related Art

Such tools are often used for withdrawing pulleys or discs from their shaft, or rolling bearings mounted around a shaft or inside a hollow shaft. After a prolonged period of use, the connection between these mechanical parts and their shaft can become seized up so that a very considerable extraction force is required to separate these mechanical parts from their shaft.

In addition, friction between the threaded rod of the pulling tool and the body of the tool in which the rod is mounted tends to cause the body and the legs to be carried round with the threaded rod when the rod is rotated by the user. This causes a loss of relative translational movement between the threaded rod and the body, and users naturally tend to solve this by inserting a restraining tool such as a bar between one leg and the threaded rod in order to stop the legs and the body from rotating and enable the threaded rod to move translationally with respect to the body.

In view of the large forces involved, the pressure of a bar used in this way against the threaded rod causes very noticeable damage to the threads of the rod, to the point that the tool can be made unusable.

SUMMARY OF THE INVENTION

It is a principal object of the invention to overcome this problem and to provide a very inexpensive device that will save the threaded rod of a pulling tool from becoming damaged by a member for inhibiting rotation of the legs.

The device according to the invention includes a sleeve for a pulling tool of the abovementioned type. The sleeve is characterized in that it can be mounted on the threaded rod and can form a bearing member for a member which inhibits rotation of the legs during screwing of the threaded rod.

Other characteristics are as follows:

the sleeve consists of a nut able to be screwed onto the threaded rod;

the sleeve consists of a nut of the speed-nut type;

the sleeve consists of a part that slides along the threaded rod, with a locking member engaging with the threads of the rod, the locking member being operated by a user;

the outer surface of the sleeve comprises a groove;

the sleeve has the general external form of a diabolo;

the outer surface of the sleeve is essentially cylindrical and has at least one flat;

the outer surface of the sleeve is essentially polyhedral;

the length of the sleeve is greater than its maximum diameter;

the sleeve consists of an essentially cylindrical sleeve with a blind hole in its periphery designed to take the rotation-inhibiting member; and the sleeve consists of an essentially cylindrical sleeve, on the outer surface of which is a projecting lug containing a drilled hole designed to take the rotation-inhibiting member.

The invention also relates to a pulling tool of the abovementioned type comprising a sleeve as described above.

The invention relates furthermore to a method of removing a mechanical part force-fitted or stuck to a shaft, involving use of a tool of the abovementioned type, characterized in that the method comprises the following steps:

a sleeve as defined above is fitted onto the threaded rod of the tool;

the tool is placed at the end of the shaft so that the legs grip the mechanical part to be removed;

the threaded rod is screwed down onto the shaft until the tool is held firmly on the mechanical part to be removed;

the sleeve is positioned axially on the threaded rod;

a member for inhibiting rotation of the legs is held against at least one of the legs and against the protective bearing sleeve; and the threaded rod is rotated while the tool is kept stationary by the rotation-inhibiting member, in such a way as to remove the mechanical part from the shaft.

BRIEF DESCRIPTION OF THE DRAWINGS

A clearer understanding of the invention will be gained from reading the following description which is given purely by way of example and refers to the attached drawings, in which.

DETAILED DESCRIPTION OF THE INVENTION

Figure 1:
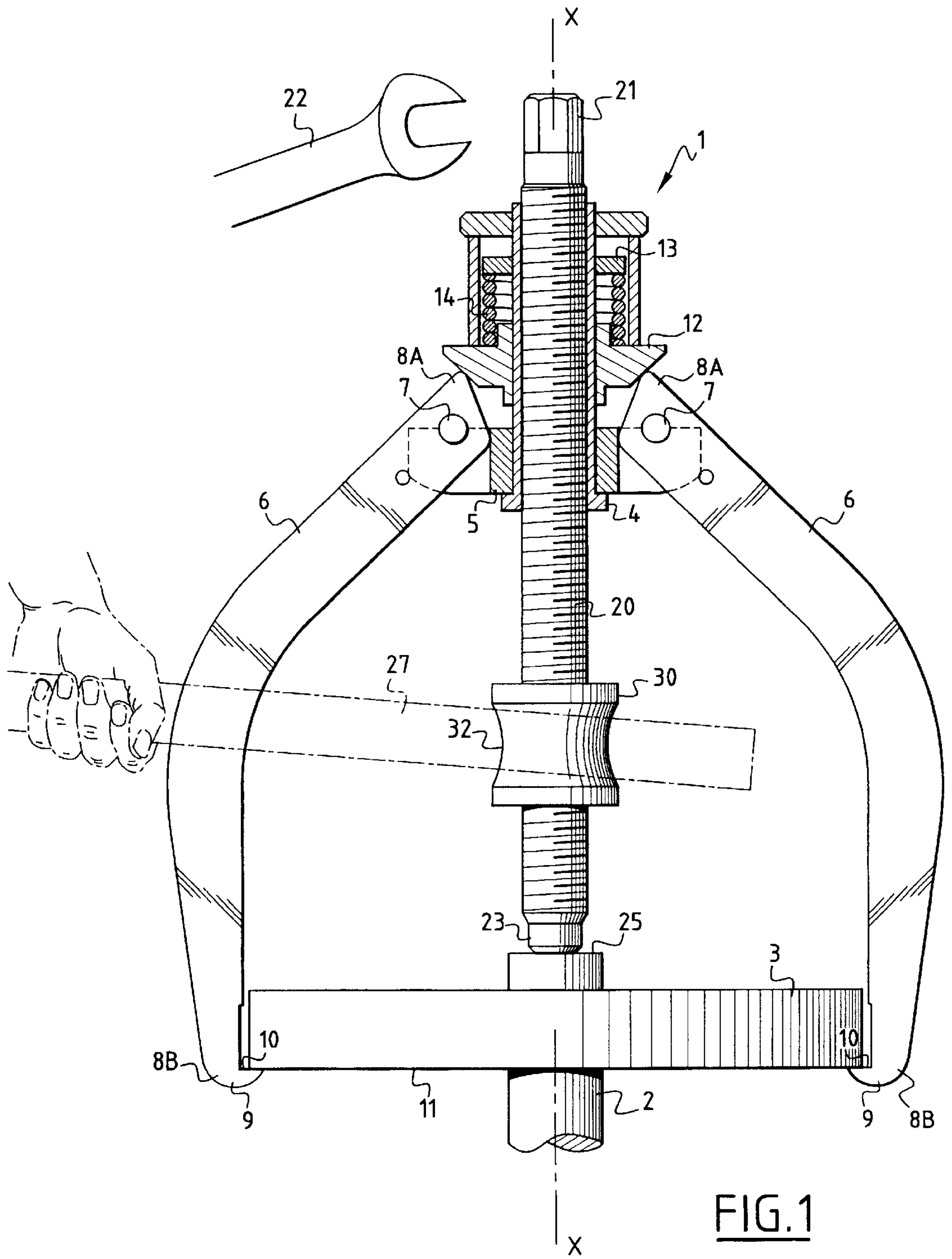
FIG. 1 is a sectional view in an axial plane through a pulling tool of a known type, equipped with a sleeve according to a first variant of the invention, being used on a mechanical part mounted on a shaft.

FIG. 1 shows a pulling tool 1 of a known type, often used to remove a revolving mechanical part 3, such as a pulley, disc or a pinion or bearing from a shaft 2 on which it has been force-fitted.

The pulling tool 1 comprises a ring 4 in the form of an essentially cylindrical tapped sleeve integral with a body 5 supporting legs 6 which grip the mechanical part 3 to be removed.

The most common pulling tools have two or three legs. The tool illustrated in FIG. 1 is convertible between a two-leg configuration and a three-leg configuration.

Each leg 6 is formed of a bent metal strip. At one end 8A of each leg 6 receives a pivot pin 7 connecting the leg 6 to the body 5, and at the other end 8B, which is the free or distal end, the leg is formed with a hook having a flat shoulder 10 facing the first end 8A. The flat shoulder is designed to bear on a rear face 11 of the mechanical part 3 to be removed.

A frustoconical part 12 slides on the ring 4 and is pushed towards the body 5 by a helical spring 14, which is compressed between the frustoconical part 12 and a stop part 13 screwed onto the proximal end of the ring 4. The resulting assembly is designed to exert pressure, by means of the spring 14, on the first end 8A of the legs 6 in order to apply a pivoting couple to the legs 6 to tend to cause the free ends 8B of the legs 6 to tighten around the periphery of the mechanical part 3 to be removed. This system enables the tool to be centered on the part to be removed.

The pulling tool 1 also has a threaded rod 20 which is screwed into the ring 4 in a nut/bolt type arrangement. The axis X—X of the rod 20 constitutes the central axis of the tool and is shown here as being vertical. The threaded rod 20 has a proximal driving end 21 designed to allow an appropriate tool such as a spanner 22 to be used by a user to rotate the threaded rod 20 and thus to generate a helical movement of the threaded rod 20 with respect to the ring 4. The threaded rod 20 has a distal end 23 designed to bear, when the pulling tool 1 is in use, against a front face 25 of the shaft 2. The face is one of the shaft ends located in close proximity to the mechanical part 3 to be removed.

It is easy to see how the pulling tool 1 works: when a user screws, e.g. with the spanner 22, the threaded rod 20 into the ring 4, the end 23 of the threaded rod 20 presses against the front end of the shaft 2. The legs 6 are stationary with respect to the mechanical part 3, so the pulling tool 1 generates opposing axial forces, i.e. on the rear face 11 of the mechanical part 3 through the hooks 9, and on the front face 25 of the shaft 2 through the end 23 of the threaded rod 20.

A pulling tool of this kind can be used to generate a much greater axial force on the screw than. that applied by the user to the spanner 22.

A cause of malfunction or loss of efficiency of such a pulling tool is due to the friction between the threads of the ring 4 and of the threaded rod 20, which tends to cause the body 5 and legs 6 to turn along with the threaded rod 20. Clearly, therefore, a user may turn the threaded rod 20 without producing any relative translational movement between the shaft 2 and the mechanical part 3.

To solve this problem, it is an actual tendency for users to place a metal bar between a leg 6 and the threaded rod 20, as shown in chain line in FIG. 1, in order to produce a rotation-inhibiting couple between the legs and the body of the tool.

The magnitude of the forces involved in this type of tool means that the bar 27 causes damage to the threads of the threaded rod 20. When so damaged, the pulling tool may be left unusable for certain conditions of use.

As is shown in FIG. 1, a sleeve 30 is mounted on the threaded rod 20 to act as a bearing member for the bar 27, and as a protective member for the threaded rod 20.

The sleeve 30 in this configuration is axially elongate, in the sense that its length is greater than its maximum diameter, in order to offer a large bearing surface area.

Figure 2:
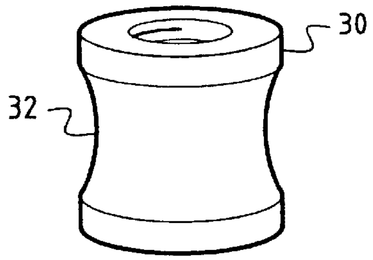
FIG. 2 is a perspective view of the sleeve employed with the pulling tool shown in FIG. 1.

According to the first variant of the invention shown in FIG. 1, and also in FIG. 2, the sleeve 30 is an essentially cylindrical tapped part designed to be screwed onto the threaded rod 20. The sleeve 30 comprises an annular groove 32 formed in its periphery. The groove 32 gives the sleeve 30 the general shape of a diabolo, the diameter of the extremities of which is greater than the diameter of the central part, and keeps the bar 27 in position as the threaded rod 20 is screwed into the ring 4.

Figure 3:
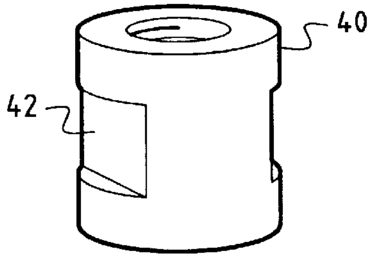
FIGS. 3 to 6 are similar views according to other variants of the invention.

According to another variant of the invention shown in FIG. 3, the sleeve 40 is of essentially cylindrical shape with two symmetrical notches 42 relative to the axis, each forming a flat in a middle region of the sleeve 40 to facilitate the application and retention of the bar 27 or other restraining means.

Figure 4:
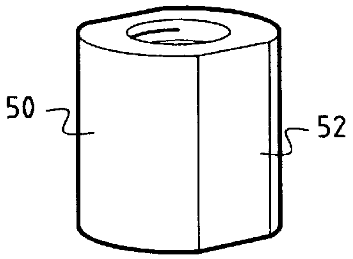

In yet another variant, shown in FIG. 4, the sleeve 50 has two symmetrical flats 52 with respect to the axis. The flats are formed along the full length of the sleeve 50 and are similarly designed to perform a bearing function.

Figure 5:
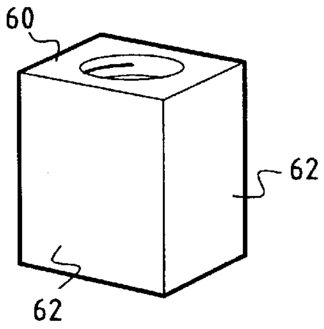
Figure 6:
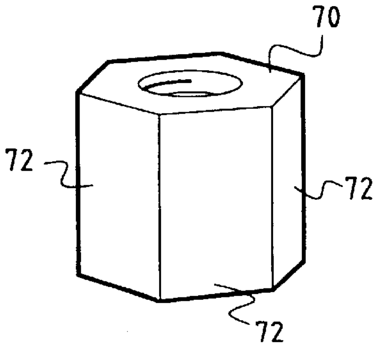

The sleeves 60 and 70 shown in FIGS. 5 and 6, respectively, have respective bearing surfaces 62 and 72 consisting of faces of right polyhedra generated by a rectangle and a hexagon, respectively.

In another variant (not shown), the bearing sleeve may consist of a rapidly movable nut or "speed nut", formed by two half-shells tapped internally and partially at one end, the other end defining a pincer region. The half-shells are hinged together in an intermediate region and a gap is provided between the pincer regions, while a return means urges the tapped ends towards each other to engage with the thread on the rod, in such a way that a stress tending to bring the pincer regions towards each other separates the tapped ends from each other and permits axial movement.

In another variant (not shown), the bearing sleeve may take the form of a rapidly movable cylindrical part that slides along the threaded rod and is provided with a locking member that engages with the threads of the rod. A return means urges the locking member into engagement with the threaded rod in order to immobilize the sliding part on the rod such that a voluntary action by the user on the locking member releases the part and permits its axial movement.

Figure 7:
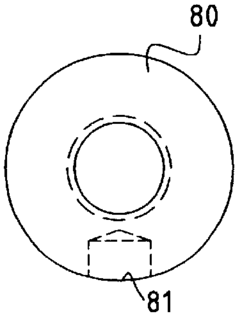
FIG. 7 is a top-down view of a sleeve according to another variant of the invention.
Figure 8:
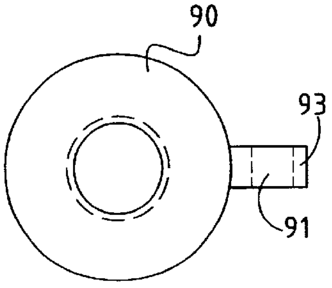
FIG. 8 is a similar view according to another variant of the invention.

In two further variants of the invention shown in FIGS. 7 and 8, the sleeve 80, 90, respectively, is cylindrical and has a housing 81, 91, respectively, formed in its periphery to take the bar 27.

In the embodiment shown in FIG. 7, the housing 81 is a blind radial hole formed in the sleeve 80.

In the embodiment shown in FIG. 8, the housing 91 is a through hole formed in a radial lug 93 projecting from the outer surface of the sleeve 90.

The embodiments that have been described relate to shafts where the mechanical parts to be removed are mounted around them, but the invention also applies to pulling tools suitable for hollow shafts with e.g. rolling bearings mounted inside them.

With the invention described above, it is possible, by the addition of a component of great simplicity that is adaptable to existing pulling tools, to protect a part that is essential to the operation of these tools. The added component produces large savings on the repair or replacement of the damaged parts.

The invention also makes for greater comfort in the use of the anti-rotation means generally used in association with pulling tools, namely the bars and other levers usually within reach of users.

What is claimed is:

1. A pulling tool for removing a mechanical part that is force-fitted or stuck on a shaft, said pulling tool comprising:

a body portion;

a threaded rod received in said body portion, said threaded rod having a first end defining a driving portion, and a second end for bearing on a face of the shaft;

a plurality of legs pivotally connected to said body portion, each of said legs having a free end for bearing on a face of the mechanical part to be removed, wherein said threaded rod is capable of moving axially relative to said body and said legs; and a sleeve mounted on said threaded rod separately from said body portion, said sleeve having an outer bearing surface, wherein said sleeve defines a bearing member for a reaction member bearing on at least one leg and on the bearing surface of said sleeve to inhibit rotation of said legs during rotation of said threaded rod, and wherein said sleeve includes an outer peripheral surface which defines at least one groove.

2. A pulling tool as claimed in claim 1, wherein said sleeve is a substantially cylindrical element having an outer peripheral surface that is narrower at an intermediate portion relative to end portions of the substantially cylindrical element.

3. A pulling tool as claimed in claim 1, wherein said sleeve comprises a nut that is screwed onto said threaded rod.

4. A pulling tool for removing a mechanical part that is force-fitted or stuck on a shaft, said pulling tool comprising:

a body portion;

a threaded rod received in said body portion, said threaded rod having a first end defining a driving portion, and a second end for bearing on a face of the shaft;

a plurality of leas pivotally connected to said body portion, each of said legs having a free end for bearing on a face of the mechanical part to be removed, wherein said threaded rod is capable of moving axially relative to said body and said legs; and a sleeve mounted on said threaded rod separately from said body portion, said sleeve having an outer bearing surface, wherein said sleeve defines a bearing member for a reaction member bearing on at least one leg and on the bearing surface of said sleeve to inhibit rotation of said legs during rotation of said threaded rod, and wherein said sleeve includes an outer peripheral surface which defines an annular groove.

5. A pulling tool as claimed in claim 4, wherein said sleeve comprises a nut that is screwed onto said threaded rod.

6. A pulling tool for removing a mechanical part that is force-fitted or stuck on a shaft, said pulling tool comprising:

a body portion;

a threaded rod received in said body portion, said threaded rod having a first end defining a driving portion, and a second end for bearing on a face of the shaft;

a plurality of legs pivotally connected to said body portion, each of said legs having a free end for bearing on a face of the mechanical part to be removed, wherein said threaded rod is capable of moving axially relative to said body and said legs; and a sleeve mounted on said threaded rod separately from said body portion, said sleeve having an outer bearing surface, wherein said sleeve defines a bearing member for a reaction member bearing on at least one leg and on the bearing surface of said sleeve to inhibit rotation of said legs during rotation of said threaded rod, and wherein a position of said sleeve on said threaded member is adjustable independently of a position of said body portion.

7. A pulling tool as claimed in claim 6, wherein said sleeve has a length that is greater than its maximum diameter.

8. A pulling tool as claimed in claim 6, wherein an outer surface of said sleeve is generally cylindrical and has at least one flat surface.

9. A pulling tool as claimed in claim 6, wherein an outer peripheral surface of said sleeve is essentially polyhedral.

10. A pulling tool as claimed in claim 6, wherein said sleeve is a cylindrical member formed with a blind hole for receiving a rotation-inhibiting member.

11. A pulling tool as claimed in claim 6, wherein said sleeve comprises a cylindrical member, and a projecting lug that projects from the outer surface of said sleeve, said projecting lug having a drilled hole for receiving a rotation inhibiting member.

12. A pulling tool as claimed in claim 6, wherein said sleeve comprises a nut that is screwed onto said threaded rod.

* * * * *